Feb. 1, 1966    W. J. KINDERMAN    3,232,111
LIQUID LEVEL INDICATOR
Filed Sept. 24, 1962    3 Sheets-Sheet 2
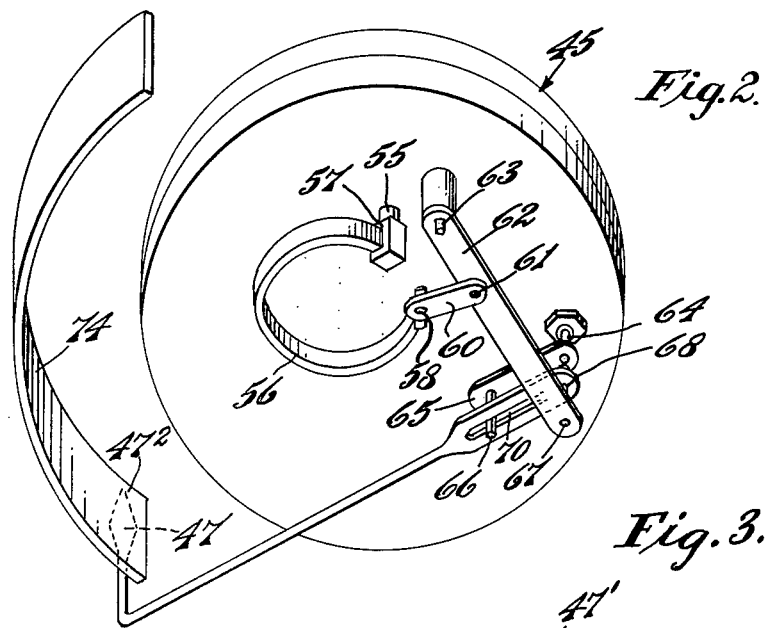
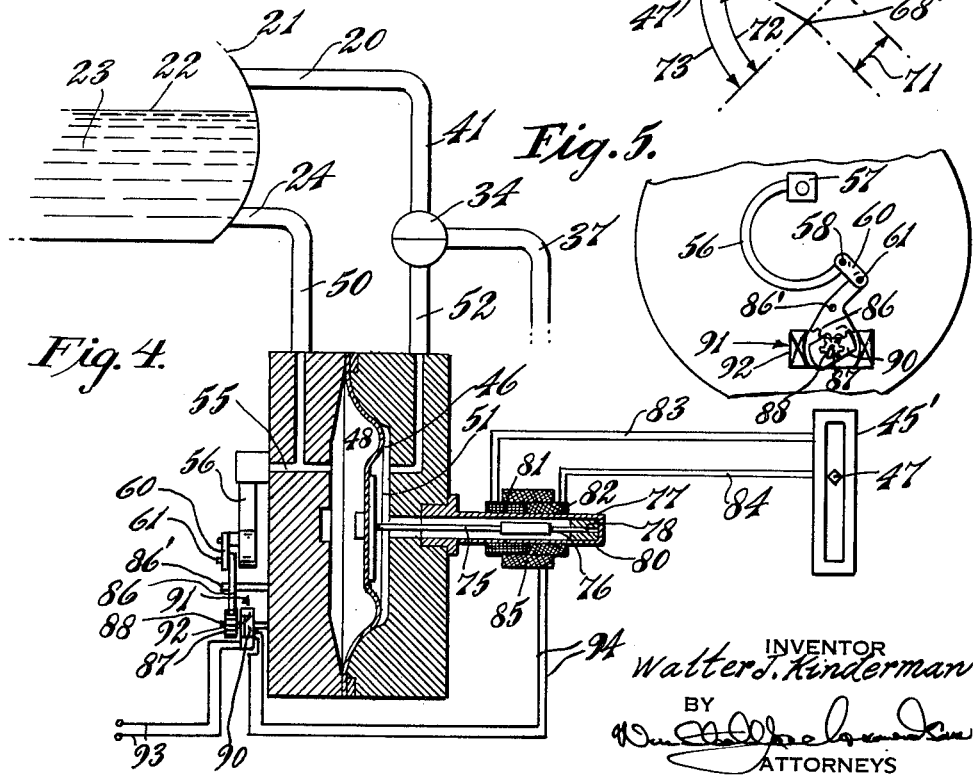
INVENTOR
Walter J. Kinderman
BY
ATTORNEYS

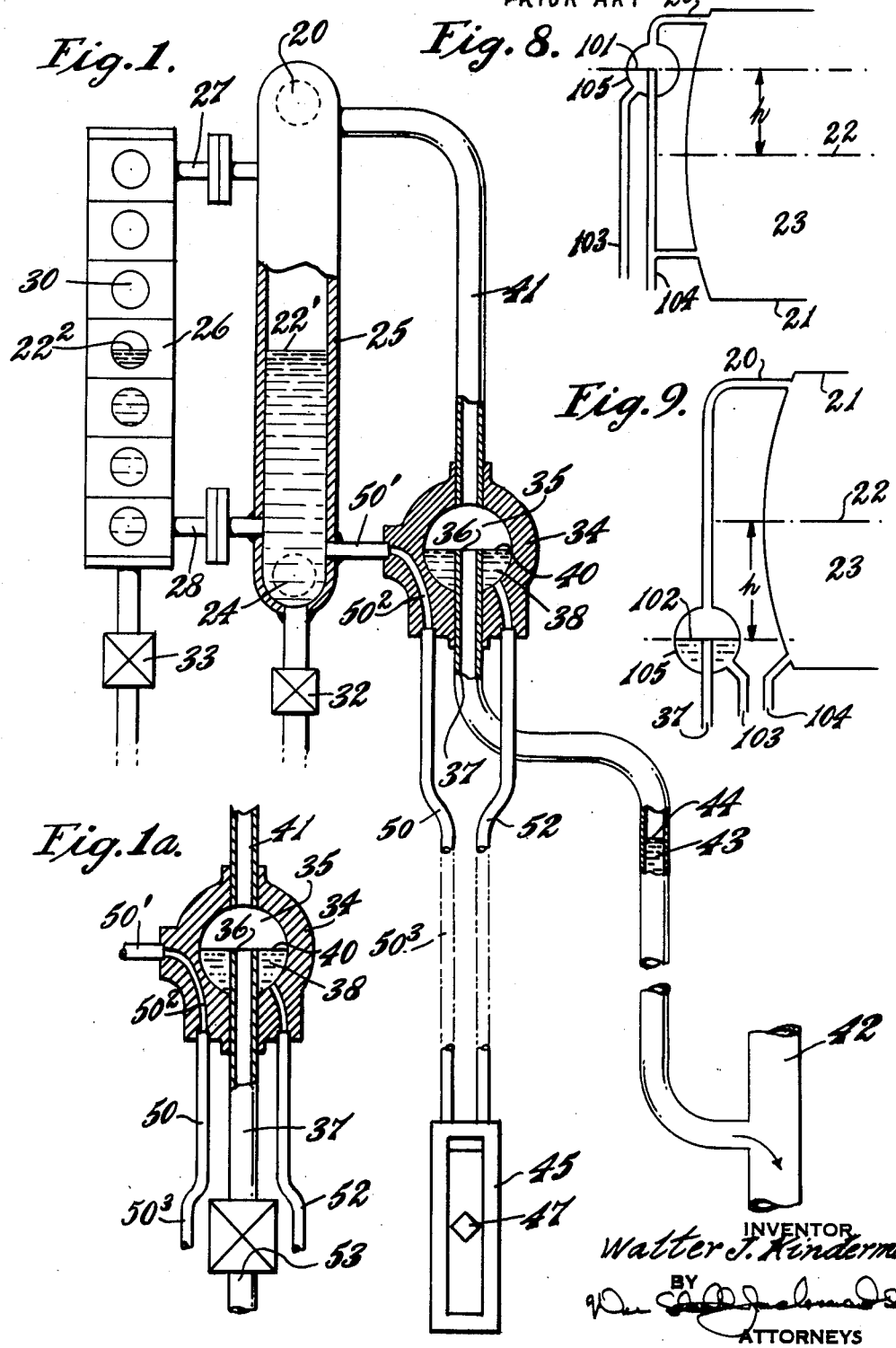

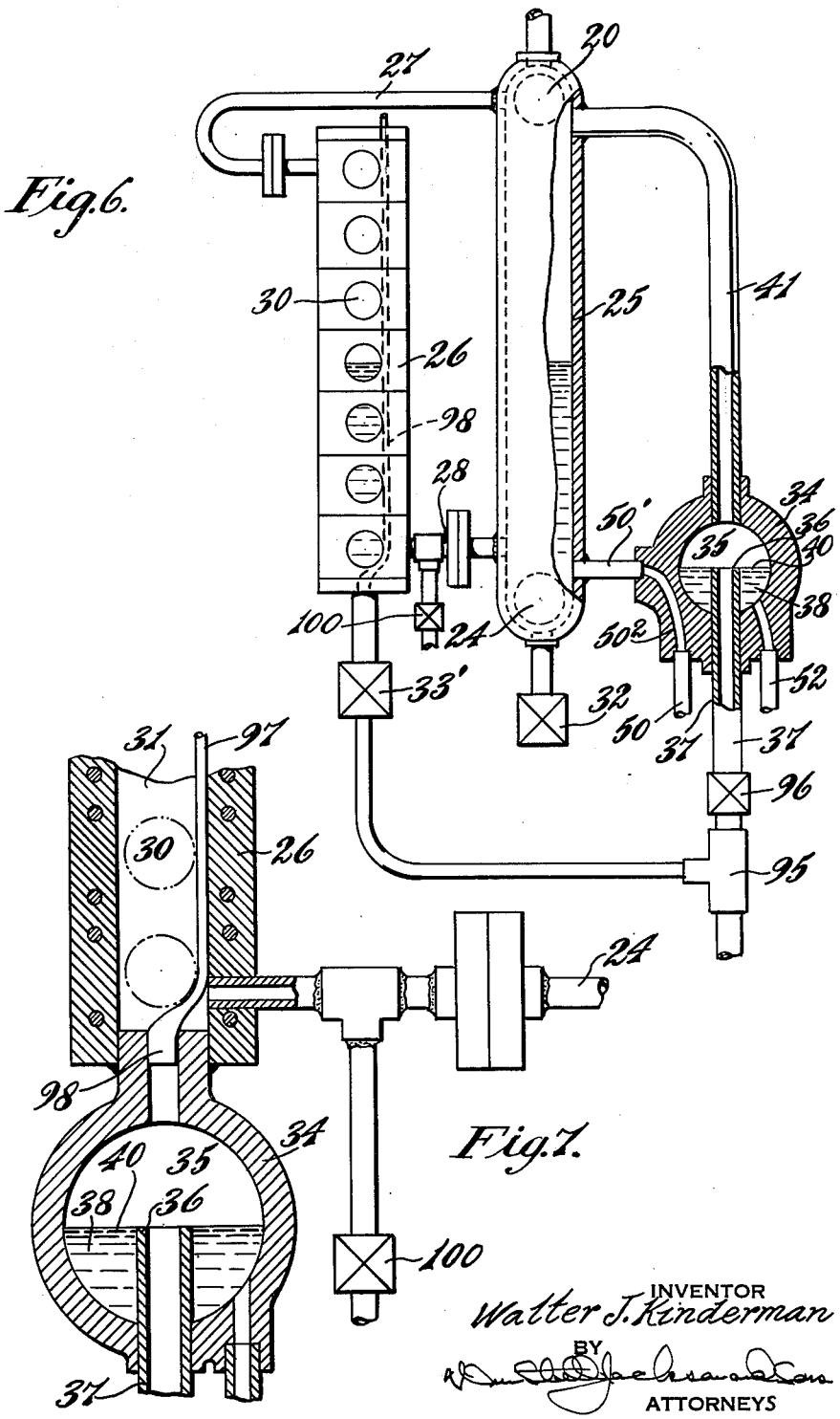

United States Patent Office 3,232,111
Patented Feb. 1, 1966

3,232,111
LIQUID LEVEL INDICATOR
Walter J. Kinderman, Philadelphia, Pa., assignor to Yarway Corporation, Philadelphia, Pa., a corporation of Pennsylvania
Filed Sept. 24, 1962, Ser. No. 225,533
4 Claims. (Cl. 73—301)

The present invention relates to liquid level indicators of the type which are particularly intended to indicate the level of water or other liquid in a boiler, but which can also be used to indicate the level of a liquid in any other tank, whether it is maintained at elevated temperatures as in the case of a heat exchanger or condenser, or is maintained at high, ambient or low temperature as in the case of a chemical tank.

A purpose of the invention is to eliminate danger of obtaining an inaccurate liquid level measurement due to sudden reduction in pressure in a tank, especially a high pressure boiler.

A further purpose is to obtain more direct liquid level measurement, without subtracting from a constant high overflow water leg in measuring the variable head of boiler water or the like.

A further purpose is to obtain higher accuracy in respect to compensation by simplifying the compensation for change in density of liquid with change in temperature and pressure.

A further purpose is to eliminate the water leg associated with a high overflow constant reference column and the errors introduced by temperature and density variations of the water leg.

A further purpose is to equalize the temperature along the entire extent of the connecting tubes from the variable and low constant reference heads thus excluding density variation errors.

A further purpose is to permit the correction for boiler water density to be in direct relation to the values which appear in the steam tables, avoiding any empirical factor, so that the steam power engineer can always check the accuracy of the gage without having special knowledge in instrumentation.

A further purpose is to obtain electrical actuation of an indicator free from any possibility of leakage at the observation point.

A further purpose is to permit miniature and full-sized liquid level indicators to be interchanged.

A further purpose is to economize by reducing the size of a liquid level indicator transmitter.

A further purpose is to permit the use of lighter boiler fittings in connection with liquid level gages.

A further purpose is to permit operation of an indicator by electrical cable rather than pressure pipes.

A further purpose is to reduce the likelihood of freezing on installations which are outdoors or in remote locations.

A further purpose is to permit remote indications with less lag in indications.

A further purpose is to permit the liquid level indicator receiver to be located with a greater range of selection with respect to the location of the transmitter.

A further purpose is to permit operation of multiple liquid level indicator receivers at smaller cost.

A further purpose is to provide for a positive thermodynamic condensation cycle for maintenance of a reference level.

A further purpose is to provide for a reference level even in the absence of heat radiation.

A further purpose is to insure continuity of reference level liquid replenishment and stability.

Further purposes appear in the specification and in the claims.

In the drawings I have chosen to illustrate a few only of the numerous embodiments in which the invention may appear, selecting the forms shown from the standpoints of convenience in illustration, satisfactory operation and clear demonstration of the principles involved.

FIGURE 1 is a diagrammatic illustration partly in vertical section of a liquid level indicator in accordance with the invention.

FIGURE 1a is a fragmentary view similar to FIGURE 1 showing a variation.

FIGURE 2 is a diagrammatic perspective showing one form of density correction according to the invention.

FIGURE 3 is a diagram useful in explaining the operation of the device of FIGURE 2.

FIGURE 4 is a diagram partly in vertical section of a further variation in the device of the invention, showing an electrical method of correcting for difference in density.

FIGURE 5 is a fragmentary diagrammatic left end elevation of FIGURE 4 showing the density correcting device.

FIGURE 6 is a view similar to FIGURE 1 showing a further variation.

FIGURE 7 is an enlargement of a portion of FIGURE 1 showing a further variation.

FIGURE 8 is a schematic view showing the prior art use of a high reference level.

FIGURE 9 is a view similar to FIGURE 8 showing the use of the low reference level of the invention.

Described in illustration but not in limitation and referring to the drawings:

In the prior art, practically all remote liquid level indicators, especially when applied to steam boilers and similar vessels which have variable liquid level, respond to the difference in hydrostatic pressure between a fixed high overflow level in a constant head chamber which is located above the highest level to be indicated and therefore above the highest point to be reached by the variable liquid level. In steam boiler indicators this high overflow level is maintained by condensation of the vapor phase (which may be steam in the case of a boiler), or in special cases by a pressure source which allows the liquid to flow into the reference chamber slowly at a rate in excess of any normal loss of evaporation.

This basic prior art system is simple and it has been quite satisfactory in boilers operating under comparatively low pressures. When, however, boiler pressures have increased as in modern power plants, complications are encountered, as it is necessary in this instance to compensate for changing density of the boiler water. For example, at 2000 p.s.i. the density of the boiler water at saturation drops to 60% of the density of water at 212° under a pressure of one atmosphere, and the indication is subject not only to the correction for the overall density but to the correction for the difference in temperature of the constant head column with respect to saturation or ambient conditions (depending upon which is the established reference temperature).

If the high constant head column is bathed in steam as it can be to maintain its temperature at or near saturation for reference purposes, a sudden drop in boiler pressure due to a sudden change in load or other emergency conditions results in flashing of water in the constant head chamber and loss of the constant head level. Unfortunately, the resulting error is on the high side, and serious consequences have resulted where the boiler operator has relied upon the false liquid level reading thus produced. This difficulty is so serious that it is impractical to utilize devices of this kind on future high pressure boilers unless they are provided with special precautions to restore the constant head level in case flashing occurs.

The ambient temperature varies with the surroundings and it is difficult to use an ambient reference temperature with any degree of accuracy, particularly since the overflow level from the high constant head chamber communicates directly with steam at saturation temperature.

Moreover, the corrective measures based on ambient temperature constant head columns are difficult to apply universally since the constant head conditions are preliminary to all subsequent compensation, and therefore represent an application variable which must be established for each individual installation before density correction can be made. This is a serious complication as it requires custom adaptation of the gage to each individual installation.

I have discovered that many of these difficulties can be wholly avoided and many novel advantages can be obtained if a constant head chamber is used as a reference and is located below the lowest level of any indication to be measured. Any column of water above this level has a direct reference to the low constant head level. The temperature variation which has been typical of a high constant head chamber is no longer present and no longer raises any problem whatsoever.

Furthermore, density correction is simplified and merely constitutes a simple correction for pressure when the low reference level is used. No constant head adjustment at the point of installation is required. A single design can be employed which is suitable for indicating overall liquid level conditions without change where a lower range in liquid level is to be indicated.

At the levels below the reference level the communication tubes or pipes to the indicator are maintained at a uniform temperature similar to the present practice, eliminating any correction for ambient temperature.

Under these conditions, the pressure function transmitted to the indicator is all that is needed to establish the density correction to the indicator in terms of an established constant relation between the reference level and the lowest level to be indicated.

Considering first the device of FIGURE 1 as an example, a high connection 20 from a boiler or the like 21 (shown in FIGURE 4) is above the level 22 in the boiler of the liquid 23. A low connection 24 from the boiler is at all times below the liquid level 22.

As shown in FIGURE 1 the high connection and the low connection communicate respectively at the top and the bottom with a water column 25 of any suitable type suitably of the character used in connection with a liquid level gage 26. A high connection 27 is made from the water column to the liquid level gage at a point near the top of the gage and a low connection 28 is carried from the water column 25 to a low point on the gage.

The high and low connections are suitably flanged as shown to permit removal of the gage without disassembly of other equipment.

The water column maintains a liquid level 22' which corresponds to the liquid level in the boiler or other tank and the gage maintains a liquid level $22^2$ which similarly corresponds. The gage has gage glasses 30 covering suitable windows in the gage and permitting visual inspection of the liquid level as well known and has an internal vertical passage 31 which contains liquid at the bottom and vapor above the liquid level. The water column 25 may be suitably drained by a valved connection 32, the valve being usually closed and the gage can be suitably drained by a valved connection 33, the valve being usually closed.

All of the features of the water column and the gage thus far described in detail may suitably be conventional.

Departing from the practice of the prior art, a constant head chamber 34 is located below the lowest indication which is to be read on the gage, so that the entire variable range of liquid level $22^2$, as well as the corresponding liquid levels 22' and 22, are always above the reference height in the constant head chamber. The constant head chamber 34 has an interior constant head space 35 and at an intermediate position has an overflow reference height 36 suitably maintained by an overflow pipe 37, so that the reference level of liquid 38 in the constant head chamber is always maintained at 40.

The high connection 20 from the boiler is connected to the upper part of the constant head chamber by a connection 41.

The constant head chamber must not be allowed to fill up above the overflow and therefore the overflow is drained. Normally, the overflow pipe 37 is connected to the downcomer 42 of the boiler and since this so-called cooling leg 37 is normally exposed to the atmosphere, the liquid at 43 in the cooling leg 37 will be at a much lower temperature than the liquid in the boiler, and will accordingly be much denser so that it will maintain a level 44 substantially below the reference height 36 in the low constant head chamber.

Any one of a wide variety of indicators may be used to indicate the liquid level, but I prefer to use an indicator of well known type having a movable element such as a diaphragm which is subjected to different pressures on the two sides and which moves a pointer to indicate the liquid level, as shown for example in U.S. Patents Nos. 2,600,822, granted June 17, 1952, for Recording and Including Resonant Vibratory Aspects; 2,617,300 granted November 11, 1952, for Flow Meter; 2,869,371, granted January 20, 1959, for Compensating Mechanism for Indicator; and 2,509,644, granted May 30, 1950, for Differential Pressure Cage.

In using a differential pressure indicator of this type, whose detail will be shown more fully in FIGURE 4 for example, an indicator 45 has a movable element 46, suitably a diaphragm, and is subjected to pressure on the two sides to operate a pointer 47 which may be manipulated by a mechanism of one of the patents described above. The indicator 45 is normally below the low reference level 40 (although the electrical device 45' can be at any height). It will be evident that the indicator may be and sometimes is located above the variable and reference levels, in which case the heads represented by the connecting tubes cancel each other out.

A variable head connection to one side 48 of the movable element (FIGURE 4) is made suitably through connection 50 which as shown in FIGURE 1 consists of a pipe 50', a passage $50^2$ and a pipe $50^3$. A constant head connection to the other side 51 (FIGURE 4) of the movable pressure element 46 is made by pipe 52 from the liquid 38 (FIGURE 1) which has the level of the overflow 36 in the constant head chamber 34.

Thus, in operation of the device of FIGURE 1, it will be evident that the water column 25 and the gage interior maintain liquid levels 22' and $22^2$ which correspond to and are closely related to the liquid level 22 in the tank such as the boiler. Steam occupies the space of the water column and the gage above the liquid level and steam also occupies the space in the low constant head chamber above the reference level 40 maintained by the overflow 36.

In normal operation condensate is constantly dropping down into the constant head chamber, since the steam connection 41 is at a temperature below the temperature of the boiler, being exposed to the ambient temperature. The condensate, however, constantly flows out the overflow which by virtue of the cooling leg maintained by the connection 37 has a liquid level 44 always below the level of the low constant head chamber. The overflow flows to the downcomer 42 and returns to the mud drum of the boiler in the preferred embodiment.

It will be evident that in a high pressure boiler there is a great difference in height between the steam drum and the mud drum and therefore the low reference level is quite feasible and the cooling leg provided by the drain connection 37 is adequate to maintain the overflow 36 at the desired reference height. The water in the cooling leg maintains a level 44 which will suitably be a few feet below the reference level 40 in the low constant head chamber, in relation to the saturated water in the boiler. The reference level in the low constant head chamber is constantly replenished by the condensate which enters through the steam connection 41.

The lower location of the constant reference head removes it from immediate proximity of the surrounding hot steam heated surfaces and this favors cooling of the contained water below the steam water interface. Moreover, the side overflow drainage form of FIGURE 4 serves to remove the steam overflow from heat transfer relationship with the reference level condensate and permits a greater degree of subcooling where this is desired. This provides insurance against any appreciable flashing resulting from a sudden pressure drop and insures continued accuracy in the event of pressure fluctuations. If desired, cooling fins can be provided on the outside surfaces of the reference level vessel which would subcool the contents to a more extreme degree where this may be desirable.

Since the low reference level is normally dependent upon density differences between water in the cooling leg and water in the boiler circulation system, it can become inoperative on shut down of the boiler unless special precautions are taken to keep the low reference chamber drained. This can, of course, be done by manual drainage of the overflow when the boiler is shut down if there is occasion to use the indicator while the boiler is not in service. Generally this situation is comparable to the possible loss of level by evaporation in the case of a column having a high reference level, but it is believed that it will not be a problem since there are direct means for determining water level on shut down, such as visible water gages. It will, of course, be evident that water level at shut down is not critical as it does not affect the integrity of the system.

FIGURE 1a shows an alternate method of draining the low constant head chamber. This system is the same as that of FIGURE 1 except that the drainage connection 37 extends to a drainage device 53, which will preferably be a steam trap, but may suitably be a controlled orifice device or other means which will exhaust the overflow at a rate slightly in excess of the maximum condensation rate to be encountered. This would not return the liquid to the mud drum, but would discharge the liquid to the condenser or otherwise. This will provide operation under all conditions but is not self-contained and free from maintenance problems as in the case of the cooling leg return system of FIGURE 1. Where drainage outside the boiler is permitted, it is important that the flow rate be sufficiently low to prevent any measurable pressure drop at the low reference level or that the steam supply connection be large enough to avoid substantial pressure drop incident to drainage.

One of the great advantages of the device of the invention, as already explained, is the simplicity, freedom from error, and easy checkup in connection with the density correction system.

In FIGURES 2 and 3 I show a simple manual density correction in accordance with the present invention as applied to the indicator. In this case the indicator 45 on the side 48 connected to the variable liquid column has a branch connection 55 which communicates with the inside of a Bourdon tube 56 mounted at one end at 57 and having a movable end provided with a pin 58. The pin 58 pivotally connects to one end of a link 60, the other end of which pivotally connects by a pin 61 to a correction lever 62 which is fixedly pivoted on a pin 63 at one end.

The indicator, suitably involving a spiral magnetically susceptible armature, as in the patents above referred to, turns a shaft 64 which has rigidly mounted on the outer end a crank arm 65 which rigidly mounts a crank pin 66 extending parallel to the shaft. The crank pin thus applies the operating impulse from the movable element of the differential pressure gage.

The correction lever 62 at its outer end carries parallel to its pivot a pin 67 parallel to the shaft and fixed on the correction lever. The pointer 47 pivots at 68 on the correcting pin 67, and this always operates as the pivot for the pointer.

The crank pin 66 passes through and in slidable but close toleranced engagement with a longitudinal slot 70 which extends along the pointer but does not extend fully to the pivot 68.

Thus, by reference to FIGURE 3 it will be seen that the correction arm 62 by swinging under the action of the Bourdon tube, moves the pivot pin for the pointer from 68 to 68'. Assuming that the range of corrective motion of the pivot 68 of the pointer is shown at 71 and corresponds to the displacement of the pivot of the pointer from 68 to 68' in FIGURE 3, it will be evident that when the pressure compensator is retracted the pointer will be in position 47 since its position is determined by the points 68 and 66, whereas when the pressure compensator is extended, the pointer will be in position 47' since its position is determined by the points 68' and 66.

Thus, for a movement of the actuator pin 66 shown by the angle 72, the pointer by reason of its compensation moves through a larger angle 73.

Thus the differential pressure water level indicator responds in inverse relation to the correction which was previously made in the case of a high reference level. In order that this be done, the differential pressure connections are reversed and the magnetic spiral is wound with a reverse twist from that previously used. Thus, the pointer has a low reference level pointer position $47^2$ and moves over the scale 74 in response to increasing variable head.

The Bourdon tube 56 moves the pointer pivot generally longitudinally of the pointer and varies the ratio of pointer movement in inverse relation to the change of density as measured from the reference level.

This not only effectively compensates but reduces the correction factor to a single directly applied function which is directly related to densities appearing in published steam tables and can easily be checked as to accuracy by any competent steam engineer. This is further assurance as to the validity of the correction when the indicator is checked. The operator can therefore be confident that his indicator is correct at all times.

The principles of the invention can be applied with an electrically operated remote indicator of the type shown in Williams U.S. Patent No. 2,899,615, granted August 11, 1959, for Linear Movement Remote Control Servo System. I show an indicator of this character in FIGURES 4 and 5.

In this instance the movable element 46 is connected by a push rod 75 with a magnetically susceptible core or armature 76 in a differential pressure cell 77. The rod is guided in the cell at 78 and the cell has a wall of non-magnetically susceptible material at 80 which makes a pressure tight enclosure but permits the core or armature to move back and forth.

The differential pressure cell has differential transformer windings 81 and 82 according to the Williams patent above referred to which communicate by wiring 83 and 84 respectively with the remote indicator 45'.

The differential transformer has a primary winding 85 which is powered through the variable transformer 91. The Bourdon tube 56 is mounted and connected as in the form of FIGURES 2 and 3 to a link 60 and the link pivotally connects by pin 61 to a segment 86 pivoted on fixed pivot 86' and which moves in intergeared relation with a pinion 87 on shaft 88. The shaft 88 pivotally mounts the secondary or armature winding 90 of the variable transformer 91 which has the surrounding stator winding 92 and receives alternating current energization by power leads 93. The armature winding 90 of the variable inductance is connected through suitable pigtails to electric leads 94 connected to primary differential transformer winding 85 which surrounds the differential transformer coils of the differential pressure cell.

The stator coils 92 of the variable transformer are connected to a standard power source such as 110 volts A.C., while the secondary or rotor coil connects with a primary as previously indicated.

As the rotor of the variable transformer 91 is actuated in response to the Bourdon tube, the input voltage is caused to vary in inverse relationship to the density with corresponding effect upon the output signal of the differential transformer. Thus, the reduced travel of the core and the corresponding reduction in differential transformer output is compensated by variation of the magnitude of the input. The net effect, therefore, is that the secondary instrument in balancing the corrected output magnitude will indicate in proper accord with the liquid level changes.

Thus, in a wholly electrical instrument the advantage of the low reference level constant head chamber will be apparent in view of the direct adaptability of the Bourdon tube pressure element to control the power input in inverse relation to the density change with pressure to maintain the output signal in direct proportion to the liquid level. This has the advantage of eliminating pressure piping from the areas of complex electric panel instruments and greatly facilitating the use of multiple instruments or the change from large instruments to miniature instruments. The simple compensation resulting from the low reference level greatly simplifies the obtaining of accurate compensation.

It will be evident that the low reference level constant head chamber can be used in a water column or hollow tie bar construction of a conventional type.

FIGURE 6 shows a device in which the gage is equipped with a heater tube. The gage drains through valve 33' which in this case is normally open and is used chiefly to permit disconnection of the gage for cleaning or otherwise. The valve 33' connects to a T 95 in the overflow connection 37 which is provided with a normally open valve 96, likewise used to permit disconnection. Gage 25 is provided with a heater tube 97 as described more in detail in FIGURE 7. The steam heated gage in this case corrects erroneous level readings resulting from the subcooling and therefore contraction of the water in the gage, which makes the gage indicate a lower level than the true level of the water in the boiler. Since the steam heated gage requires a cooling leg, the combination can be served by a common drainage connection 37 which serves as a cooling leg for both the constant head chamber and also for the gage. This leads to improved accuracy of the gage reading as well as to a better remote level indication.

It will be evident that the gage will suitably be connected to the water column through normally open valves, not shown, which will permit shutoff to remove the gage.

FIGURE 7 shows the reference chamber mounted on the bottom of the gage and steam heating of the gage used to provide condensate for the low reference chamber. In this case, as in FIGURE 6, the gage 26 has a steam heater tube 97 as well known which conducts steam down through the length of the gage. At the bottom, however, the steam heater tube is connected at 98 with the steam connection to the constant head chamber 34 so that it furnishes condensate to the low constant head chamber which drains back to the boiler through the cooling leg 37. The gage is drained through a suitable valve 100 and a drain of this sort is also provided in FIGURE 6.

The invention can also result in cost reduction. The low reference level device of the invention is more compact, has fewer and less bulky parts, is more streamlined in appearance and lends itself to a consolidated design, as just described. Since the low reference level is used, the calibration index can be standardized and a single reference design can be used instead of different references which depend upon peculiarities of the individual installation and the variant ranges of indication. Thus, the entire mechanism is produced at lower cost.

In addition to the previously advanced advantages there is a fundamental thermodynamic benefit to be derived from this invention as compared to the prior art use of the high reference level. FIGURE 8 shows the prior art structure showing the use of a high reference level 101 in constant head chamber 105. Constant head connection 103 and variable head connection 104 connect to a suitable indicator. FIGURE 9 shows the structure of the invention using a low reference level 102.

With respect to FIGURE 8 showing the high reference level which has been in common use in the art, steam is generated and released at interface level 22 and will be at saturation pressure $P_s$ and corresponding saturation temperature $T_s$. In other words, it is released at thermodynamic equilibrium with respect to level 22.

As the steam rises above the level 22, however, its pressure will diminish as a function of $d_s h$ where $d_s$ is the steam density and $h$ is the height above 22. Thus, saturated steam released at 22 will become superheated as it rises above 22 by reason of its reduced pressure head as influenced by gravity.

Normally the heat loss by radiation and the relatively small differentials of head make this a negligible quantity with respect to high reference level systems. In a perfectly insulated system, however, this leads to the conclusion that superheated steam will be supplied with respect to reference level 101 and this superheat, although slight, must be dissipated before the steam can condense to supply the liquid in the reference level reservoir. It is well known in the art that steam in the superheated condition even under conditions of cooling tends to retard condensate formation thus indicating that this system is basically unfavorable to condensate formation and depends upon cooling to maintain the high reference level 101.

In the case of the low reference level as indicated by FIGURE 9, the steam rising above interface level 22 also tends to develop superheat in relation to its loss of head as it rises, but at the low level 102 which is below 22 it is subject to a pressure increase as a function of $d_s h$ and is, therefore, relatively sub-cooled with respect to the saturation pressure and temperature at 22. With establishment of thermodynamic equilibrium condensation will therefore take place even under conditions of perfect insulation and the system is therefore basically favorable to the positive maintenance of a reference level.

Under practical conditions of heat loss by radiation the condensation cycle would be accelerated from initially favorable conditions of the low reference level and this is also on the safe side of stabilizing the liquid in the event of rapid pressure drop. With the high reference level the heat loss must first take care of the slight superheat condition resulting from the high evaluation level of the reference level before it can condense and cool the liquid to a lower temperature. Thus, the formation of condensate is subject to retardation but the formation of flash steam on lowered pressure of the system is favored.

In view of my invention and disclosure, variations and modifications to meet individual whim or particular need will doubtless become evident to others skilled in the art to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a liquid level indicator, a boiler containing liquid whose level is to be indicated having a downcomer and having a high connection above the level of the liquid in the boiler and a low connection below the level of the liquid in the boiler, in combination with a differential pressure indicator having a movable element responsive to difference in pressures applied to the opposite sides of the movable element, a liquid connection from the low connection to one side of the movable element, a constant head chamber having an overflow at a reference height which is located at all times below the level of the liquid in the boiler but above the indicator, having a fluid connection to the chamber above the overflow from the high connection of the boiler exposed to cooling from the ambient temperature and constantly depositiing condensate in the chamber, and having a liquid connection from the chamber below the overflow to the other side of the movable element, and means connected to the overflow for draining liquid from the overflow and maintaining the level of the liquid in the chamber at the level of the overflow comprising a cooling leg connected from the overflow to the downcomer, said means for draining the overflow permitting discharge from the overflow at a rate sufficient to prevent the chamber from filling with liquid above the overflow.

2. An indicator of claim 1, in combination with means for varying the movement of the indicator in response to a given movement of the movable element in inverse relation to the change in density of the liquid as measured from the reference level.

3. An indicator of claim 2, having a pivoted pointer and means acting on the pointer on a lever arm for moving the pointer as the movable element moves, in which the means for varying the movement of the indicator comprises means responsive to said change in density for varying the position of the pointer pivot.

4. An indicator of claim 3, which is energized electrically from the movable element, in which the means for varying the movement of the indicator comprises electrical means for changing the energization of the indicator in inverse relation to the change in density.

References Cited by the Examiner

UNITED STATES PATENTS

| | | | |
|---|---|---|---|
| 1,622,794 | 3/1927 | Martin | 73—301 |
| 2,337,171 | 12/1943 | Winton | 73—302 |
| 2,869,371 | 1/1959 | Kinderman | 73—432 |

FOREIGN PATENTS 61,735  10/1913  Austria.

ISAAC LISANN, *Primary Examiner.*